United States Patent [19]

Burzi et al.

[11] Patent Number: 4,723,347
[45] Date of Patent: Feb. 9, 1988

[54] METHOD FOR THE MANUFACTURE OF WOUND CAPACITORS

[75] Inventors: Amedeo Burzi, Marzabotto; Loris Fusini, Brento, both of Italy

[73] Assignee: Arcotronics Italia S.p.A., Bologna, Italy

[21] Appl. No.: 928,885

[22] Filed: Nov. 10, 1986

[30] Foreign Application Priority Data

Nov. 13, 1985 [IT] Italy .................................. 3604 A/85
Jun. 30, 1986 [GB] United Kingdom ................. 8615960

[51] Int. Cl.⁴ ............................................. H01G 4/18
[52] U.S. Cl. .................................... 29/25.42; 361/323
[58] Field of Search ............... 29/25.42; 361/313, 323, 361/433 W

[56] References Cited

U.S. PATENT DOCUMENTS

| | | | |
|---|---|---|---|
| 923,889 | 6/1909 | Pruessman | 29/25.42 X |
| 1,337,505 | 4/1920 | Brinton | 29/25.42 X |
| 1,385,379 | 7/1921 | Kratz | 29/25.42 X |
| 4,325,167 | 4/1982 | Rosenberg | 361/323 X |
| 4,363,162 | 12/1982 | Price | 29/25.42 |

FOREIGN PATENT DOCUMENTS 1148330 2/1958 Fed. Rep. of Germany .
17658 2/1977 Japan ................................. 29/25.42

Primary Examiner—Donald A. Griffin
Attorney, Agent, or Firm—Carl A. Forest

[57] ABSTRACT

Wound capacitors are manufactured by winding foils on a mandrel which is heated sufficiently to set the initial turns without fusing them, thus stabilizing the circular profile produced by the mandrel so that the profile is retained when the mandrel is removed from the wound capacitor.

8 Claims, 1 Drawing Figure

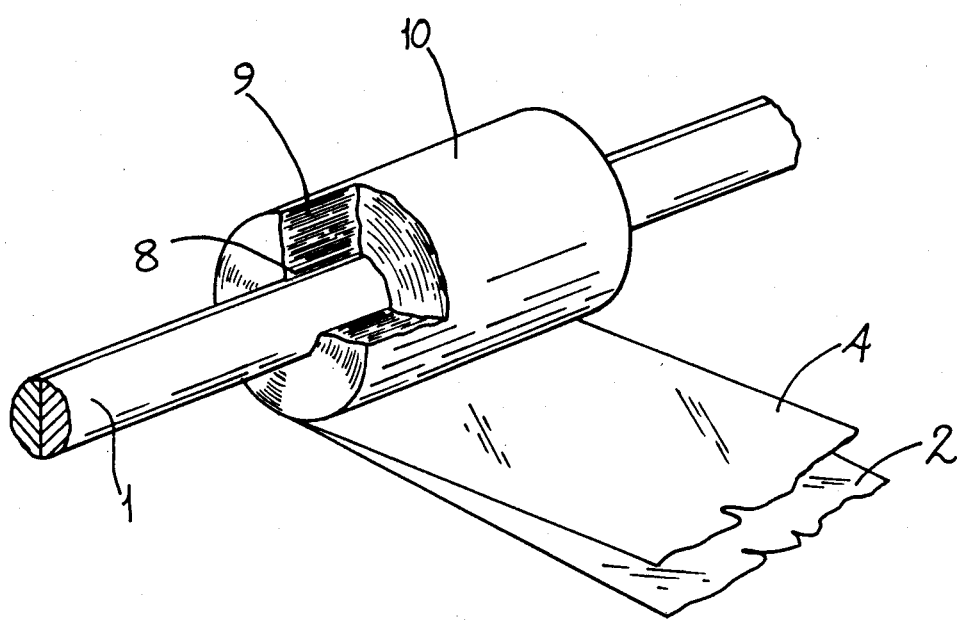

METHOD FOR THE MANUFACTURE OF WOUND CAPACITORS

FIELD OF THE INVENTION

This invention relates to the manufacture of capacitors, which are produced by winding dielectric strip superimposed with associated metal layers, on a rotating mandrel, usually metal.

BACKGROUND OF THE INVENTION

In the manufacture of wound capacitors the capacitor electrodes are usually provided by prior metallization of one of the dielectric strip surfaces, but the electrodes may also be provided by a metal strip interposed between non-metallized dielectric strips.

Following completion of winding of the strip, the mandrel is removed from the finished capacitor, which is cylindrical in form, and the latter is then subjected to successive processing phases.

If the strip is wound without adopting special measures, when the capacitor is removed from the mandrel, the initial wound turns of the strip, which constitute the innermost layers, do not maintain the circular form produced by the mandrel. This causes undulation in the initial part of the strip which forms the initial turns, made possible by the axial hole left in the capacitor by the mandrel, giving rise to inward projections: this modifies the characteristics of the capacitor.

The presence of these inward projections may cause considerable problems of a mechanical nature, which have a deleterious effect on the electrical characteristics of the finished product when manufacturing steps which follow winding of the strip are performed, in particular the crushing of the wound capacitor between two planes parallel to its axis to provide a flat sided capacitor.

Crushing, which is intended to flatten the capacitor, eliminating the central hole, can cause accidental bedding down of the projections which are bent over, forming folds, and small quantities of air can remain trapped inside, with detrimental effects on future performance of the capacitor. In addition, folds which fall into a position parallel to the planes between which the capacitor is pressed, cause non-uniform stratification of the rolled strip. During the flattening phase, bosses can be formed on the outer circumference of the capacitors, which are then subjected to increased pressure, and depressions, which are thus subjected to less pressure. Increased pressure in the areas corresponding to the folds, which is difficult to quantify, reduces the thickness of the dielectric strip locally, thus producing substantial reductions in the voltage needed to cause electrical breakdown in such areas. Thus a consistent circular shape of the central aperture of the wound capacitor removed from the mandrel is important for consistent characteristics of the final flattened capacitor.

European Patent No. 0007121 discusses a method for constructing a sleeve in the centre of a wound capacitor, obtained by partial fusion of the initial turns of the wound strip. This is achieved by means of a heated pad which slides on the initial wound turns, according to a preset pressure, transferring heat to the latter. As well as involving a highly complex machine, this method tends to increase the production time for each capacitor. Further, the fusion of the initial turns requires that these turns, if the capacitor is made from metallized dielectric strip, are all demetallized which increases the bulk of small capacitors.

OBJECTS OF THE INVENTION

An object of the invention is to provide an improved method for the manufacture of wound capacitors by means of winding in which initial turns of the winding are stabilised.

SUMMARY OF THE INVENTION

The above and other objects are accomplished according to the present invention by providing a method for the manufacture of wound capacitors in which dielectric strip, either metallized on one side or in combination with a metal strip, is wound onto a cylindrical mandrel. During the winding, the said mandrel is heated to a sufficiently high temperature to set the initial turns wound on the mandrel into the circular shape of the mandrel, without causing any fusion together of such turns.

A method according to the invention results in a capacitor in which the initial turns are stiffened, having sufficient mechanical strength to maintain the circular profile produced by the mandrel, even after removal of the latter from the finished wound capacitor, without fusing the initial turns together.

BRIEF DESCRIPTION OF THE DRAWINGS

There now follows a detailed description, to be read with reference to the drawing, of a method of manufacturing capacitors embodying the invention.

The drawing shows the manufacture of a capacitor by winding dielectric strip, metallised on one side, onto a cylindrical metal mandrel.

DESCRIPTION OF THE PREFERRED EMBODIMENT

With reference to the drawing, 1 represents a metal mandrel, consisting of two pin halves of semi-circular section with plane surfaces abutting each other, supported and rotated by mechanisms of a known type, which are not shown.

In carrying out a preferred method embodying the invention two dielectric strips 2 and 4 are wound on the mandrel 1 producing a wound capacitor 10. The metal electrodes of the capacitor, not shown, are provided by metallization of one side of each of the dielectric strips 2, 4, as is well known.

A short portion of the strips 2 and 4, at least that in contact with the spindle, is demetallized. During winding of the strips, the mandrel is heated to a temperature sufficiently high to produce setting or stablization of the spatial arrangement of the initial turns 8 without causing fusion. The temperature of the mandrel is adjusted to be appropriate for the material of the film.

The mandrel may be heated to a constant temperature or raised to a convenient temperature for a short period of time while the wound capacitor is in position on the mandrel. The temperature of the mandrel depends on a variety of factors—the material of the dielectric films, its thickness, the size of the mandrel, whether the heating is constant or variable, and, particularly where the heating is constant, the length of time for which the wound capacitor remains on the mandrel.

We prefer to use a mandrel heated to a constant temperature, and for dielectric films of conventional thickness and in conventional capacitor winding mechanisms in which the capacitor is on the mandrel for from 5 to 20 seconds (dependent on the number of turns necessary to obtain a desired capacitance), we have found the following temperatures effective:

| Polyester films | 60° C.–100° C. |
|---|---|
| Polypropylene films | 50° C.–90° C. |
| Polycarbonate films | 70° C.–110° C. |

The setting of the turns in carrying out a process according to the invention does not require the film to be demetallized and the amount of demetallization of the initial turns is determined only by the requirements of the capacitor. Consequently smaller capacitors can be manufactured having the desired capacitance. The capacitors are of higher quality and, as the heat is applied during the winding of the capacitors, there is no increase in the cycle time of manufacture.

The action of heat stiffens the said initial turns 8, increasing the mechanical strength, which enables the said turns to maintain the circular profile produced by the mandrel 1, even after removal of the mandrel 1 from the finished capacitor 10. The stiffened turns may include some turns which are provided with metallization.

The layers of the surrounding area 9, however, remain perfectly in contact with one another, avoiding any undulation or introduction of air. When subsequent crushing of the capacitor takes place (as, for some capacitors, occurs in a further stage of manufacture), the stiffened initial turns 8, are flattened together with the surrounding layers, providing a smooth outside surface, by virtue of perfect uniform stratification of the strip.

It will be realized that if a capacitor is made from dielectric strips with an interposed metallic foil, the method just described can still be utilized.

Heating of the metal mandrel 1 can be achieved in various ways.

One way of heating the mandrel provides for the flow of a fluid, which is either liquid or gaseous, which laps the mandrel at various points or passes through ducts provided in the mandrel. This fluid, which is heated to a suitable temperature, transfers its own heat to the mandrel, thus heating the latter. A preferred form utilises hot air (at an appropriate temperature) blown on the mandrel.

A method of heating which may be preferred in some circumstances uses the mandrel as an electrical resistance: an appropriate voltage may be applied across the ends of the mandrel for a preset period of time so that an electric current flows through the mandrel thereby heating the mandrel to a desired temperature.

Alternatively the mandrel can, for example, be subjected to a variable magnetic field; eddy currents induced inside it produce heat.

According to a further variant, during rotation, the mandrel comes into contact with a fixed projection and is pressed against it with light pressure. Heat produced by friction between the fixed part and the rotating mandrel has the effect of heating the latter.

In each case it is preferable to incorporate a sensor in the mandrel by which the temperature can be controlled.

Clearly all of the above forms of heating of the mandrel, and hence of the initial wound turns of strip 2 and 4, do not involve stopping or slowing down the winding phase, or the successive phases, nor do they require the use of complex devices associated with the machine supporting and rotating the mandrel.

In addition, the electrical characteristics of capacitors 10 remain unaltered after removal of the mandrel 1, improving the quality of the capacitors, both in regard to the final cylindrical configuration and the flattened form: the advantages obtained in regard to the present state of the art are clear.

The stiffening of the initial wound turns, with consequent stabilization of the circular profile of the latter, does not involve any fusion, even partial, of the strip forming these turns, which has an extremely positive effect, as the initial turns can still be, consequently, capacitively active.

The method of the invention is particularly useful where especially thin strips 2 and 4 are used, for example in the manufacture of miniature capacitors. Further the advantages obtained are not affected by the nature of the material forming the dielectric strip.

What is claimed is:

1. Method for the manufacture of wound capacitors in which dielectric strip, either metallized on one side or in combination with a metal strip, is wound onto a cylindrical mandrel wherein, during the winding, the mandrel is heated to a sufficiently high temperature to set the initial turns wound on the mandrel into the circular shape of the mandrel without causing any fusion together of such turns.

2. Method according to claim 1 wherein the dielectric strip is polyester and the mandrel is heated to 60° C. to 100° C.

3. Method according to claim 1 wherein the dielectric strip is polypropylene and the mandrel is heated to 50° C. to 90° C.

4. Method according to claim 1 wherein the dielectric strip is polycarbonate and the mandrel is heated to 70° C. to 110° C.

5. Method according to claim 1 wherein the mandrel is heated by the passage of an electric current through the mandrel for a preset period.

6. Method according to claim 1 wherein the mandrel is heated by the use of a hot fluid.

7. Method according to claim 1 wherein the mandrel is heated by induction.

8. Method according to claim 1 in which the wound capacitor, after removal from the heated mandrel is compressed into a form having two parallel flat sides.

* * * * *